July 21, 1936.                O. OLDBERG                2,048,079
BUSHING
Filed Feb. 8, 1935
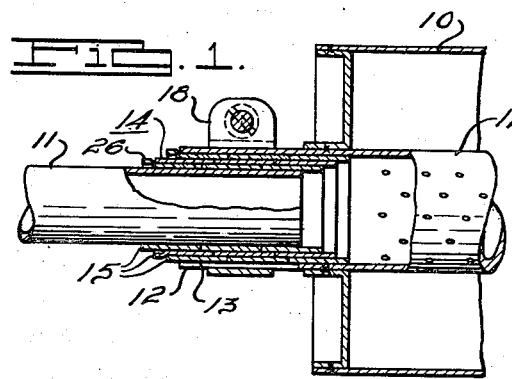
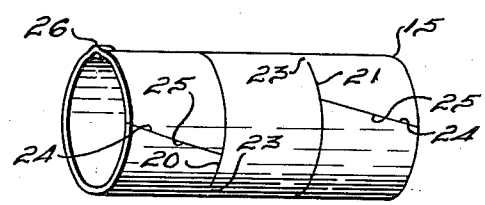
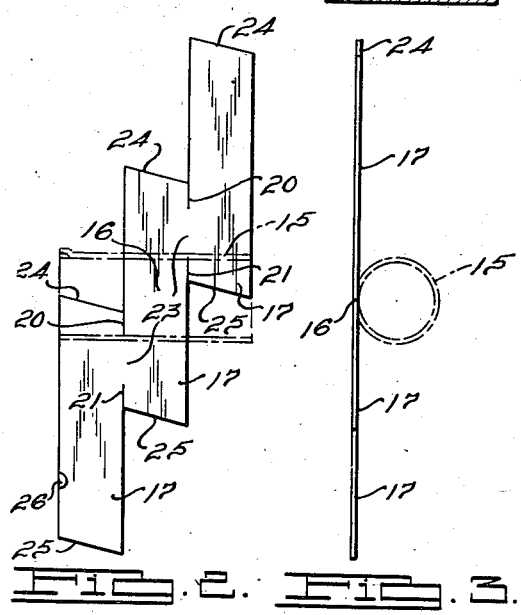
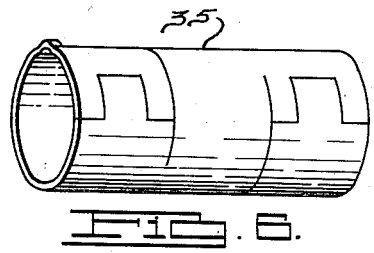
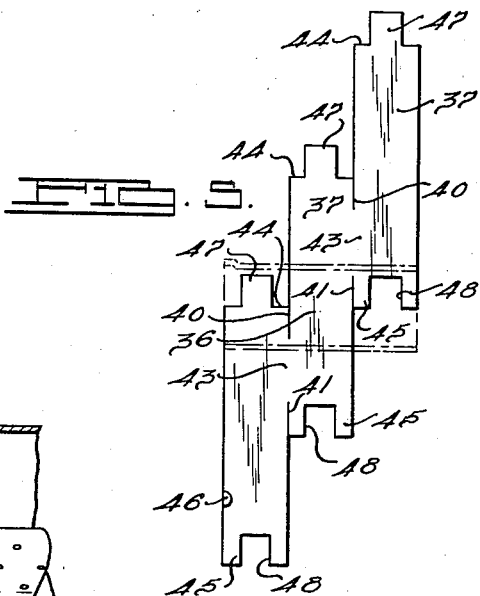
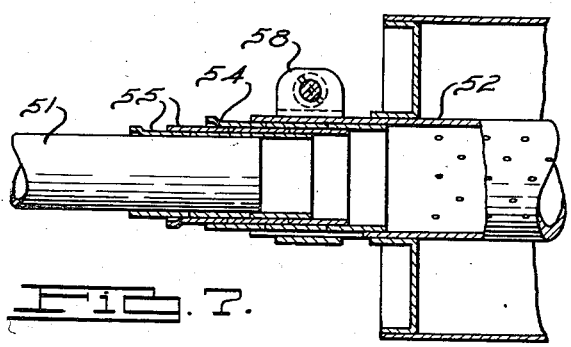
INVENTOR.
Oscar Oldberg.
BY
Harness, Dickey, Pierce & Hann.
ATTORNEYS.

Patented July 21, 1936

2,048,079

UNITED STATES PATENT OFFICE 2,048,079

BUSHING

Oscar Oldberg, Detroit, Mich.

Application February 8, 1935, Serial No. 5,511

10 Claims. (Cl. 285—183)

This invention relates to bushings for use as a size reduction fitting in exhaust systems of internal combustion engines or in other lines for handling fluids under pressures of moderate or low magnitude.

In connecting together different parts of such exhaust systems or other fluid conveying lines, especially where replaceable parts are provided, such as mufflers and the like, the substituted parts often require size reduction fittings or bushings in order to effect the desired connection of such parts into the lines or conduits.

It is an object of this invention to simplify the art of effecting such connections.

A further object is to provide a bushing which is easy to install and which effectively prevents leakage.

Another object is to provide a laminated type of bushing whereby the desired size reduction may readily be obtained.

Another object is to provide a bushing construction which may be fully tightened by the use of a minimum external clamping force.

It is also an object of the invention to provide a liminated type of bushing construction wherein the laminations interlock together upon the application of an externally applied clamping pressure both to prevent disassembly of the bushing and to minimize leakage.

A still further object of the invention is to provide a bushing construction which may be employed in lengthening or elongating a pipe line connection as well as effecting the desired size reduction at such connection.

Other objects, features and advantages will become apparent from the following description and appended claims.

For the purpose of illustrating the genus of the invention, typical concrete embodiments are shown in the accompanying drawing, in which:

Figure 1 is a fragmentary, side elevation, parts being broken away and in section, of a muffler and exhaust pipe connection employing a bushing construction according to the present invention;

Figs. 2 and 3 are side and end elevations, respectively, of a bushing piece or lamination employed in the construction shown in Fig. 1;

Fig. 4 is a perspective of the piece or lamination shown in Figs. 2 and 3, but rolled to cylindrical form;

Figs. 5 and 6 are views similar to Figs. 2 and 4, respectively, of a modified form of bushing piece or lamination; and Fig. 7 is a central, longitudinal section of a bushing construction employed in a connection similar to that shown in Fig. 1, except that the connection is lengthened or elongated.

Referring to Fig. 1, there is shown by way of example, an application of the invention embodied in a connection between a muffler 10 and an exhaust pipe 11 of the exhaust system for an internal combustion engine, or the like. In this arrangement, the muffler 10 includes a pipe or conduit 12, the internal diameter of which is greater than the external diameter of the exhaust pipe 11. The connection between the pipes 11 and 12 includes a composite bushing 14 comprising a plurality of individual bushings 15 assembled with the pipes in telescopic relation. Where the difference between the internal diameter of the pipe 12 and the external diameter of the pipe 11 is slight, a single individual bushing piece or lamination 15 of proper thickness may be employed, however, where a substantial difference in size exists between these diameters, a suitable number of individual bushing pieces 15 are preferably employed. Three of the individual bushing elements 15 are illustrated in the arrangement of the composite bushing 14 depicted in Fig. 1. Except for size, the construction of each of the bushings 15 is the same. The composite bushing 14 may be tightly secured to the pipes 11 and 12 by splitting the pipe 12 as indicated at 13, and tightening a split clamp means 18 superposed upon the end of the pipe 12.

Reference may also be had to Figs. 2 to 4, inclusive, which illustrate, more in detail, the construction of the individual bushing elements 15. In the fabrication of these bushing elements, a blank 16 of sheet material, preferably sheet metal, is cut to the form shown in Fig. 2, so as to provide a plurality of laterally connected but staggered strips 17. These strips within the same bushing element 15 are of equal length and are severed by cuts 20 and 21 from one another except for uncut portions 23 of relatively short lengths as compared to the lengths of the strips. As indicated in Fig. 2, the laterally interconnected strips 17 are arranged in echelon and the opposite ends 24 and 25 thereof are parallel in each strip as well as parallel to the corresponding and opposite ends of the remaining strips. It is also noted that the ends 24 and 25 of the strips are cut at an angle of other than 90 degrees with respect to the lateral edges of the strips, the angle being such that the ends 24 and 25 are generally inclined inwardly toward the adjacent uncut portions 23 which serve to interconnect the strips.

Any number of strip elements 17 may be used in the formation of the individual bushing element 15 dependent upon the service to which they may be placed. The length of the strip elements 17 of the individual bushing elements 15 of composite bushing 14 are such that in one bushing element 15 the length of the strip elements 17 is greater than that of the strip elements of the bushing on which it is superposed by an amount approximately equal to the product of the thickness of the sheet material employed and the ratio of circumference to diameter of a circle.

The blanks, cut as indicated in Fig. 2, are rolled to cylindrical form as indicated in broken lines in Figs. 2 and 3 and in full line as indicated in Fig. 4. Thus, with the strip elements of the individual bushings 15 of the lengths indicated, the desired number of bushing elements 15 is employed to give the size reduction required and the clamping means 18 is tightened so as to fix the composite bushing to the pipe elements to be connected. As the clamp means is tightened, the bushings localize themselves to the conditions encountered so that the individual bushing elements 15 upon which the maximum clamping pressure is exerted, contract to the greatest extent. Thus, only a minimum amount of radially inwardly directed force applied externally to the composite bushing will be required to fully tighten the bushing so as to permit substantially no leakage thereto.

Since the ends 24 and 25 of the strip elements are parallel, the bushings 15, in the form shown in Fig. 4, afford no continuous passages through the bushings and provide substantially close contact between the abutting ends 24 and 25 when the bushing is contracted by means of a clamping device, such as the clamp means 18. It is also noted that, since the engaging faces of the ends 24 and 25 of the strip elements are arranged at an angle with respect to the axis of the bushing, the ends of the strip elements 17, remote from the interconnecting portions 23, will be sprung or forced laterally to a slight extent so as to bring the lateral margins of each strip element into close contact with the adjacent strip element. The ends of the strip elements closely adjacent the interconnecting portions 23 will not be as readily sprung or forced laterally so that close contact between the sides or lateral margins of the strip elements will be obtained. Thus tight and substantially leak proof contact will be effected between adjacent surfaces of both the lateral sides and ends of the strip elements when contracting clamping forces are applied to the exterior surface of the bushing element 15.

Protuberant portions 26 may be provided at one end of each of the bushings 15 for the purpose of preventing movement or creeping of the individual bushing elements in one direction so that one or more of the bushing elements cannot be forced into the pipe 12 of the muffler during assembly. The bushing elements are made from blanks 16 of sheet material which are sufficiently thin so that they may be readily rolled to the desired shape and so that they may yield sufficiently to facilitate their installation.

The angular arrangement of the end surfaces 24 and 25 of strip elements 17 with respect to the axis of the bushing not only serves to crowd the lateral edges of the strip element into contact so as to minimize leakage, but also holds the end strips in the desired position so that they will not be sprung laterally and torn from the bushing.

Reference may now be had to Figs. 5 and 6 in which is illustrated a slightly modified form of cut blank 36 and bushing 35 rolled therefrom. The blank 36 is cut to provide strips 37 by forming cuts 40 and 41 therein corresponding to the cuts 20 and 21 of the previously described embodiment. Uncut portions 43 interconnect the strips with one another so that the strips are arranged in echelon or staggered formation. The ends 44 and 45 of the strips, corresponding to the ends 24 and 25 of the previously described embodiment, instead of being cut at an angle with respect to the axis of the bushing formed, are provided with tongues 47 on the ends 44 adapted to be received in slots 48 provided in the opposite ends of the strip. The tongues 47 fit closely within the slot 48 so as to seal the bushing against leakage therethrough and to align the strip ends so as to produce a bushing which is axially symmetrical, substantially as described with reference to the previous embodiment. Protuberant portions 46 may be provided at a marginal edge of the bushing for the purpose of limiting relative axial movement of a composite bushing in one direction, as before.

Referring to Fig. 7 of the drawing, a composite bushing 54 comprises a plurality of individual bushings 55 assembled in telescoping relation but extended so as to elongate the composite bushing and effect a connection where there is but slight or no overlap between the pipes or conduits 51 and 52. A split clamp means 58 may be employed to effect a contraction of the pipe 52 and of the composite bushing 54 so as to lock the pipes and the composite bushing in the desired assembled relation.

As many changes could be made in the above constructions and many apparently widely different embodiments of this invention could be had without departing from the spirit thereof, it is intended that all matter contained in the above description or shown in the accompanying drawing, shall be interpreted as illustrative and not in a limiting sense.

What is claimed is:

1. A bushing for use in connecting conduits of different sizes comprising, a piece of sheet material so cut as to provide a plurality of integral strips arranged in side-by-side but staggered relation, the connection between said strips having a longitudinal extent less than the longitudinal overlap of said strips, said piece being shaped to cylindrical form with the two ends of each strip in opposed relation.

2. A bushing for use in connecting conduits of different sizes comprising, a piece of sheet material so cut as to provide a plurality of strips arranged in side-by-side but staggered relation, said strips being joined to each other by but a small amount of stock of said piece, said piece being shaped to cylindrical form with the two ends of each strip in abutting relation, and interlocking means for preventing material relative lateral movement between the abutting ends of each strip.

3. A bushing for use in connecting conduits of different sizes comprising, a piece of sheet material so cut as to provide a plurality of strips arranged in side-by-side but staggered relation, each strip being joined to the next adjacent strip by an uncut portion of said piece of lesser extent than the overlap of said strips, said strips being shaped to cylindrical form, each strip having the same diameter and the ends of each strip being arranged in opposed relation.

4. A bushing for use in connecting conduits of different sizes comprising, a piece of sheet material so cut as to provide a plurality of strips arranged in side-by-side but staggered relation, each strip being joined to the next adjacent strip by a comparatively short uncut portion of said piece, said strips being shaped to cylindrical form, each strip having the same diameter and the ends of each strip being arranged in abutting relation, and means for so interlocking the ends of each strip that the piece provides an axially symmetrical hollow cylinder.

5. A bushing for use in connecting conduits of different sizes comprising, a piece of sheet material so cut as to provide a plurality of strips arranged in side-by-side but staggered relation, each strip being joined adjacent one end to the next adjacent strip by a comparatively short uncut portion of said piece, said strips being shaped to cylindrical form and of the same diameter, the ends of each strip being in abutment and being cut so as to dovetail together to prevent substantial relative lateral movement therebetween.

6. A bushing for use in connecting conduits of different sizes comprising, a piece of sheet material so cut as to provide a plurality of strips arranged in side-by-side but staggered relation, each strip being joined adjacent one end to the next adjacent strip by a comparatively short uncut portion of said piece, said strips being shaped to cylindrical form and having the same diameter, the ends of each strip being parallel but at an angle with respect to the axis of the bushing.

7. A bushing for use in connecting conduits of different sizes comprising, a piece of sheet material so cut as to provide a plurality of strips arranged in side-by-side but staggered relation, each strip being joined adjacent one end to the next adjacent strip by a comparatively short uncut portion of said piece, said strips being shaped to cylindrical form of the same diameter and with their ends in abutment, each strip being provided with a tongue at one end and with a slot at its other end for receiving said tongue for preventing substantial relative lateral movement of such strip ends.

8. A bushing comprising a plurality of superposed pieces of sheet material each being so cut as to provide a plurality of laterally interconnected strips arranged in echelon, the strips of each piece being joined to the next adjacent strip of the same piece by a comparatively short uncut portion of the piece, said pieces being shaped to cylindrical form with the opposite ends of each strip in abutment, and means for interconnecting the ends of each strip to prevent substantial relative lateral movement therebetween.

9. A bushing for use in connecting conduits of different sizes, comprising a piece of sheet material so cut as to provide a plurality of laterally interconnected strips arranged in echelon, each strip being joined adjacent one end to the next adjacent strip by an uncut portion of said piece, each strip being shaped to cylindrical form of the same diameter as that of the other strips, and means at the ends of each strip for preventing substantial relative lateral movement between the strip ends and for forcing the lateral margins of adjacent strips into contact under the action of externally applied clamping forces directed toward the axis of the bushing.

10. A bushing comprising a plurality of telescoped pieces of cylindrically formed sheet metal, each piece comprising a plurality of laterally connected circumferentially positioned strips arranged in echelon, the strips of each piece being of equal length to those of the same piece and the strips of the several pieces being of progressively increasing length whereby the respective ends of each strip on all pieces are in substantial abutment.

OSCAR OLDBERG.